United States Patent Office 3,586,686
Patented June 22, 1971

3,586,686
BIPYRIDYLIUM QUATERNARY COMPOUNDS
John Theodore Braunholtz, Bracknell, England, assignor to Imperial Chemical Industries Limited, London, England
No Drawing. Continuation-in-part of application Ser. No. 803,984, Mar. 3, 1969, which is a continuation-in-part of application Ser. No. 312,001, Sept. 27, 1963. This application June 10, 1970, Ser. No. 45,210
Claims priority, application Great Britain, Oct. 1, 1962, 37,036/62
Int. Cl. C07d 31/48
U.S. Cl. 260—294.8R        5 Claims

ABSTRACT OF THE DISCLOSURE

The compounds of the invention consist of certain bis-bipyridylium quaternary salts, to process for making them and to biologically active compositions containing them for herbicidal use.

The bis-bipyridylium salts having the following structure

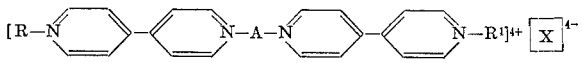

wherein R and $R^1$ are selected from the group consisting of alkyl radicals having 1–5 carbon atoms, $CH_3COCH_2$— and $HOCH_2CH_2$—; A is selected from the group consisting of alkylene of 1 to 6 carbon atoms, alkylene of 1 to 6 carbon atoms interrupted by an oxygen or sulfur atom, or alkylene of 1 to 6 carbon atoms containing a keto group; and $[X]^{4-}$ represents monomeric anion (anions) in the number required to neutralize the four positive charges of the quaternary cation.

Said compounds are characterized by herbicidal activity through its cation, said cation being deactivated on contact with soil and anions do not interfere with respect to the herbicidal activity of the cation.

CROSS REFERENCE TO RELATED APPLICATIONS

This application is a continuation-in-part of Ser. No. 803,984 filed Mar. 3, 1969 now abandoned, which was itself a continuation-in-part of Ser. No. 312,001, filed Sept. 27, 1963, and now abandoned.

This invention relates to bis-bipyridylium quaternary salts, to processes for making them, to biologically active compositions containing them and to the use of the salts and of compositions in processes to effect biological changes in vegetation.

This invention comprises bi-bipyridylium quaternary salts comprising two bipyridylium compounds connected together at their nitrogen atoms by a divalent aliphatic bridging group.

More particularly, this invention includes salts which have the general formula:

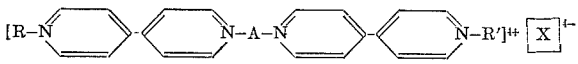

wherein R and R' are like or unlike substituted or unsubstituted alkyl groups; A is a divalent aliphatic bridging group and $[X]^{4-}$ is the anionic part of the salt. The size of the alkyl groups may vary considerably. Thus they may contain from 1 to 20 carbon atoms, although rather smaller groups containing from 1 to 5 carbon atoms are preferred. Preferably the groups are similar to one another because salts containing similar alkyl groups are generally easier to make. However, salts of considerable herbicidal activity are also obtainable when the groups are dissimilar. For the same reasons the groups are preferably unsubstituted. However, substituents may be present in either or both of the groups. Suitable substituents include amides, esterified carboxyl groups, keto and hydroxy groups.

The divalent aliphatic bridging group is preferably a hydrocarbon alkylene group although a keto group may be present and the carbon chain may be interrupted by a sulphur or an oxygen atom. The bridging group is preferably a short chain of from 1 to 6 carbon atoms. The anionic part of the salt may comprise like or unlike anions which may be mono- or polyvalent. Anions which may be used include, for example, acetate, amsonate, benzenesulphonate, benzoate, bromate, bromide, butyrate, chlorate, chloride, citrate, cyanate, chloroacetate, chromate, dichromate, formate, fluorosilicate, ferrocyanide, fumarate, fluoride, fluoborate, iodate, iodide, lactate, malate, maleate, manganate, methylsulphate, nitrate, oxalate, perchlorate, propionate, phosphate, salicylate, sulphamate, succinate, sulphate, sulphite, selenocyanate, thiocyanate, tartrate, toluenesulphonate and thiosulphate. The anionic part of the salt may comprise a number of similar anions or mixtures of different ones. Since one of the principal advantages of the compounds of the invention is that the herbicidal cations are immediately absorbed and deactivated by contact with soil, it is generally preferred not to use anions derived from herbicidal acids, since these anions may have residual effects in soil. Where such residual effects are not objectionable, anions derived from herbicidal acids may be used if desired.

Since the cation in the compounds according to the invention exerts its herbicidal effect regardless of the nature of the anion, the choice of the anion is (apart from the special considerations applying to anions which are herbicidal in their own right) a matter of convenience, depending, for example, on the ease with which the salt may be prepared, it being obvious from the description herein that whatever the anion is, it should be non-interfering with respect to the herbicidal activity of the cation. Conveniently the anion is one which gives rise to a water-soluble salt, since water is the medium in which the salts are generally employed in the treatment of vegetation. Salts which are insoluble in water may, however, be employed in the form of suspensions. A compound having a particular anion may be obtained either by direct synthesis from reactants including the desired anionic part of the salt, or by exchanging the anion of a previously prepared salt for the preferred anion by methods well known in the art, for example, by passage through an ion-exchange resin. Preferred anions are halogen ions, for example, chloride and bromide ions.

Salts in which the bipyridyl groups are the same are of greater practical importance because they are usually obtained by simpler processes. One which is especially convenient to carry out comprises bringing a mono-quaternary salt of a bipyridyl into reaction with an aliphatic quaternising agent containing at least two atoms, or groups of atoms, which are capable of undergoing a quarternising reaction with the salt. The salts which are most easily made are obtained by using an alkylene dihalide in which case the aliphatic bridging group will comprise two or more methylene groups which form part of an uninterrupted chain of carbon atoms. However, if salts are required in which the bridging group contains a carbonyl group or in which the carbon chain is interrupted by a sulphur or oxygen atom, the reaction may be carried out with the corresponding halogenated ketone, ether or thioether. Thus, a 1,3-dichloro acetone will provide an aliphatic bridging group having the structure

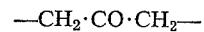

and a 1,1'-dichloro diethyl ether will result in the formation of an aliphatic group having the structure

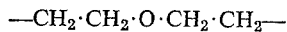

In general, any aliphatic group is suitable although a hydrocarbon group comprising from 1 to 6 methylene groups is preferred.

In a preferred process of making the salts a pyridinium salt having the general formula:

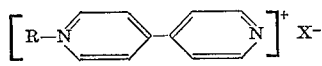

wherein R is an alkyl radical of 1–20 carbon atoms is brought into reaction with the alkylene dihalide having from 1 to 6 carbon atoms. The pyridinium salt is chosen so that its 1-alkyl substitutent is one of the alkyl substituents required in the bipyridylium salt, and the quaternising agent is such that it introduces the required bridging group. The reaction can, if desired, be carried out simply by heating the reactants together, but it may be found advisable to use the reactants in solution or suspension in a suitable solvent or diluent.

The bis-bipyridylium salts show biological and especially herbicidal activity together with the valuable property of being deactivated when they come into contact with soil. Thus, the invention also includes herbicidal compositions comprising as an active ingredient a bis-bipyridylium salt and an inert diluent for the active ingredient. The compositions can be liquid compositions in which the active ingredient is in solution or dispersion in water or a suitable organic solvent. Solid diluents may also be used provided they are substantially inert towards the salt. Solids which should preferably be avoided are those which are either highly adsorptive or act as cation-exchange material.

The ingredients used with the salts to form herbicidal compositions of this invention can be substances known to the art as being suitable in the formulation of herbicidal compositions generally, for instance, surface active substances such as wetting and dispersing agents, binders, stickers, corrosion inhibitors, stabilising agents and colouring agents. Suitable corrosion inhibitors include water soluble phosphates which give rise in aqueous solution to $H_2PO_4^-$ ions, water soluble molybdates and mixtures thereof.

Any wetting or dispersing agent used in the herbicidal compositions should preferably be a non-ionic surface-active compound, for instance an ethylene oxide-octyl phenol condensate, or a cationic compound. Anionic surface-active agents have the disadvantage that they may form insoluble salts with the bipyridylium salt. Although the salts so formed remain herbicidally effective, the insoluble material tends to settle to the bottom of the spraying tank, so that the formulation becomes inhomogeneous and the active ingredient is unevenly applied.

The herbicidal composition may contain proportions of the salt which can vary greatly. In general however for compositions which are ready for immediate application without further treatment a weight of salt corresponding to 0.002–2.00% by wt. of cation is preferred. However more concentrated compositions such as those which are prepared by the manufacturer and which preferably have to be diluted before use may contain from 5% to 50% or more of the salt expressed as cation.

EXAMPLE 1

This example describes the preparation of trimethylenebis [4(1-methyl-pyridin-4-yl) pyridinium] chloride tribromide dihydrate.

A solution of 1-methyl-4(4'-pyridyl) pyridinium chloride (8.3 g.) in monobutyl diethylene glycol (75 ml.) was heated to its reflux temperature (160–170° C.) and to the stirred, boiling solution was slowly added a solution of trimethylene dibromide (4 g.) in monobutyl diethylene glycol (10 ml.) over a period of ¾ hour, after which the mixture was heated at its reflux temperature (170–180° C.) for an hour. The reaction mixture was then cooled to 80° C., its solid yellow constituent was removed by filtration and after being washed with absolute ethanol was found to have a melting point of 284–7° C. (decomp.). This product was purified by recrystallisation from aqueous ethanol yielding a yellow solid M.P. 288–9° C. (decomp.).

EXAMPLE 2

The process of Example 1 was repeated, but using instead of the trimethylene dibromide, ethylene dibromide in a molar equivalent amount. The product, ethylenebis [4(1-methyl-pyridin-4-yl) pyridinium] dichloride dibromide monohydrate was obtained as a solid, M.P. 297–300° C. (decomp.).

EXAMPLES 3–6

Four further compounds were prepared by the general process described in Examples 1 and 2, but using instead of the 1-methyl-4-(4'-pyridyl) pyridinium chloride, other 4(4'-pyridyl) pyridinium chlorides of the general formula:

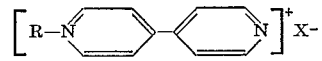

leading to the production of bipyridylium compounds believed to be of the formula:

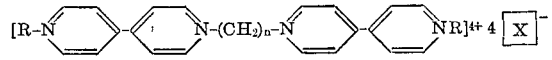

where R is a substituted methyl or ethyl radical, n is 2 or 3 and $X^-$ is a halogen ion.

The products thus obtained are set out in the following table as Examples 3–6 and are identified by the values given to R and n. All four of the products were obtained as monohydrates.

| Example No. | R | 4[X]⁻ | n | M.P. (° C.) |
|---|---|---|---|---|
| 3 | CH₃—CO—CH₂— | 4Cl⁻ | 2 | 300 |
| 4 | CH₃—CO—CH₂— | 3Br⁻, Cl⁻ | 3 | 294–5 |
| 5 | HO—CH₂—CH₂— | 3Br⁻, Cl⁻ | 2 | 300 |
| 6 | HO—CH₂—CH₂— | 3Br⁻, Cl⁻ | 3 | 268–70 |

EXAMPLE 7

Herbicidal solutions of the salts the preparations of which are described in Examples 1–6 were made by dissolving a weight of salt corresponding to 0.1% by weight of the cation in water containing 0.1% by weight of a wetting agent sold under the trademark "Agral" comprising a nonionic surface active compound obtained by condensing ethylene oxide with octyl phenol. The solutions were then sprayed onto a variety of test plants at the rate of 100 imperial gallons per acre. The herbicidal effect of the treatment was assessed 14 days later. In the test data given below the following figures indicate the amount of damage inflicted:

1 = slight damage
2 = moderate damage
3 = severe damage
4 = almost complete kill
5 = complete kill

| Ex. No. | Sugar beet | Mustard | Kale | Red clover | Mayweed | Redshank | Barley | Cocksfoot | Wheat | Wild oats |
|---|---|---|---|---|---|---|---|---|---|---|
| 1 | 2 | 3 | 3 | 2 | 2 | 2 | 3 | 3 | 3 | 3 |
| 2 | 5 | 5 | 5 | 5 | 5 | 5 | 5 | 4 | 5 | 5 |
| 3 | 3 | 2 | 4 | 4 | 4 | 4 | 3 | 3 | 3 | 3 |
| 4 | 3 | 2 | 4 | 4 | 5 | 3 | 3 | 3 | 3 | 3 |
| 5 | 2 | 4 | 4 | 3 | 1 | 3 | 2 | 2 | 3 | 3 |
| 6 | 2 | 3 | 4 | 3 | 2 | 3 | 2 | 2 | 3 | 3 |

From these results it will be seen that although the salts were used at high dilution, considerable damage was inflicted on a wide range of plants and that the salt of Example 2 was especially effective.

EXAMPLE 8

This example illustrates the preparation of ethylenebis [4(1-methylpyridin-4-yl) pyridinium] tetra-iodide.

1-methyl-4-(4-pyridyl) pyridinium methylsulphate (11.2 g., prepared by reaction of 4,4'-bipyridyl with dimethylsulphate at 0° C.) was dissolved in ethoxyethanol (40 ml.) and heated under reflux for two hours with ethylene dibromide (3.8 g.). The mixture was then filtered while hot and the filtrate allowed to cool overnight. The yellow solid which separated (1.0 g.) was dissolved by heating in methanol (30 ml.) containing the minimum amount of water to effect solution, and treated with a solution of potassium iodide in methanol. The orange precipitate was collected and washed with methanol, giving the pure tetraquaternary iodide salt.

EXAMPLE 9

This example illustrates the preparation of ethylenebis-[4-(1-methylpyridin-4-yl) pyridinium] amsonate, having the formula:

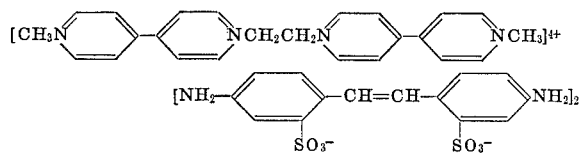

The reaction product obtained by refluxing 1-methyl-4-(4-pyridyl) pyridinum methylsulphate and ethylene dibromide, in ethoxyethanol according to Example 8 (2 g.) was taken up in water and stirred with a solution of two equivalents of the sodium salt of amsonic acid in water. A deep blue to purple precipitate separated immediately. This was washed with water and dried to give the pure tetraquaternary amsonate salt (3.4 g.).

EXAMPLE 10

This example illustrates the preparation of ethylenebis-[4-(1-methylpyridin-4-yl) pyridinium] tetrahydrogensulphate.

The tetraquaternary amsonate salt prepared according to Example 9 (1.15 g.) was suspended in hot water and stirred while concentrated sulphuric acid was added dropwise until the solution was almost clear. The small residual quantity of tetraquaternary amsonate salt was filtered off and the filtrate carbon-treated and concentrated. Addition of methanol precipitated the pure tetraquaternary hydrogen sulphate salt (0.5 g.).

EXAMPLE 11

This example illustrates the preparation of ethylenebis-[4-(1-methylpyridin-4-yl) pyridinium] tetranitrate.

The tetraquaternary amsonate salt prepared according to Example 9 (1.15 g.) was suspended in hot water and stirred while concentrated nitric acid was added dropwise until the solution was almost clear. The small residual amount of tetraquaternary amsonate salt was filtered off and the filtrate carbon-treated and concentrated. Addition of ethanol followed by ether precipitated the pure tetraquaternary nitrate salt.

EXAMPLE 12

This example illustrates the herbicidal activity of different salts of the cation of the compound of Example 2.

Solutions were prepared containing the bromochloride salt of Example 2 and the hydrogensulphate salt of Example 10. In each case the solution contained 0.1% of a wetting agent comprising a condensate of p-nonylphenol with seven molar proportions of ethylene oxide. The solutions were sprayed at a rate corresponding to 5 pounds of cation per acre onto test plants. The spray volume was 100 imperial gallons per acre and the test plants were young lettuce, tomato, and wheat plants grown in pots. Seven days after spraying the damage to the test plants was assessed on a scale of 0 to 10 where 0 is no damage and 10 is complete kill. The results are given in the table below.

| Compound | Test plant | | |
| --- | --- | --- | --- |
| | Lettuce | Tomato | Wheat |
| Product of Example 2 (bromochloride salt) | 3 | 8 | 4 |
| Product of Example 10 (hydrogen sulphate salt) | 6 | 7.5 | 4 |

It can be seen from the above table that within the limits of variation inherent in the results of a biological experiment, the hydrogen sulphate and the bromochloride salts have the same level of herbicidal activity. In a further experiment, the products of Example 8 (iodide salt), Example 9 (amsonate salt), Example 10 (hydrogen sulphate salt) and Example 11 (nitrate salt) were tested in the same way as described above, on young lettuce, tomato, barley and maize plants. The results showed that the different salts had the same level of herbicidal activity.

What is claimed is:

1. A quaternary salt which is characterised by herbicidal activity through its cation, said cation being deactivated on contact with soil and said salt having the formula:

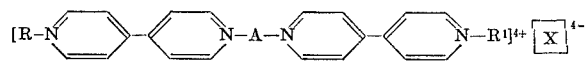

wherein R and $R^1$ are selected from the group consisting of alkyl radicals of 1 to 5 carbon atoms, $CH_3COCH_2$— and $HOCH_2CH_2$—; A is selected from the group consisting of alkylene of 1 to 6 carbon atoms, alkylene of 1 to 6 carbon atoms interrupted by an oxygen or sulphur atom, or alkylene of 1 to 6 carbon atoms containing a keto group; and $[X]^{4-}$ represents monomeric (anion) anions in the number required to neutralize the four positive charges of the quaternary cation, the anion being non-interfering with respect to the herbicidal activity of said cation.

2. A quaternary salt according to claim 1 wherein R and $R^1$ represent alkyl groups of 1 to 5 carbon atoms and A is alkylene of 1 to 6 carbon atoms.

3. A quaternary salt according to claim 1 and having the formula:

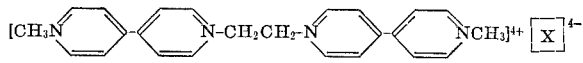

where $[X]^{4-}$ represents anions in the number required to neutralise the four positive charges of the quaternary cation but which do not interfere with the herbicidal activity of said cation and its deactivation on contact with soil.

4. A quaternary salt according to claim 1 and having the formula:

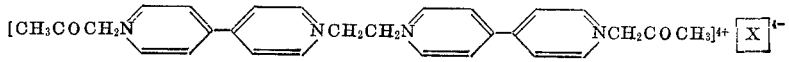

wherein [X]⁴⁻ represents anions in the number required to neutralise the four positive charges of the quaternary cation.

5. A quaternary salt according to claim 1 and having the formula:

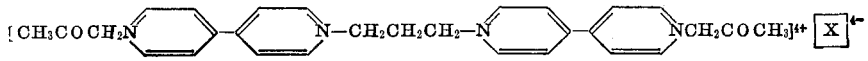

wherein [X]⁴⁻ represents anions in the number required to neutralise the four positive charges of the quaternary cation.

References Cited
UNITED STATES PATENTS

| | | | |
|---|---|---|---|
| 3,094,418 | 6/1963 | Heseltine et al. | 260—240 |
| 3,336,325 | 8/1967 | Downes et al. | 260—296 |

ALAN L. ROTMAN, Primary Examiner

U.S. Cl. X.R.

260—240-R, 294.8–G, 295–S, 296–D; 71—94